United States Patent [19]

Wössner et al.

[11] Patent Number: 4,482,036
[45] Date of Patent: Nov. 13, 1984

[54] HYDROPNEUMATIC DAMPING DEVICE

[75] Inventors: Felix Wössner, Schweinfurt; Ludwig Axthammer, Hambach; Günther Heyer, Schweinfurt; Hermann Itzinger, Dittelebrunn, all of Fed. Rep. of Germany

[73] Assignee: Fichtel & Sachs AG

[21] Appl. No.: 465,047

[22] Filed: Feb. 9, 1983

[30] Foreign Application Priority Data

Feb. 20, 1982 [DE] Fed. Rep. of Germany ....... 3206124

[51] Int. Cl.³ .............................................. F16F 9/348
[52] U.S. Cl. ........................... 188/322.13; 188/322.17
[58] Field of Search .............. 188/315, 322.13, 322.16, 188/322.17

[56] References Cited

U.S. PATENT DOCUMENTS

| 3,621,952 | 11/1971 | Long | 188/322.17 |
| 3,804,217 | 4/1974 | Keijzer et al. | 188/322.17 |
| 4,287,970 | 9/1981 | Eusemann et al. | 188/269 |
| 4,438,834 | 3/1984 | Handke et al. | 188/322.17 X |

FOREIGN PATENT DOCUMENTS

| 1145863 | 8/1961 | Fed. Rep. of Germany . |
| 2905928 | 8/1980 | Fed. Rep. of Germany . |
| 2418393 | 2/1978 | France . |
| 2015693 | 9/1979 | United Kingdom . |

Primary Examiner—Duane A. Reger
Attorney, Agent, or Firm—Toren, McGeady and Stanger

[57] ABSTRACT

A hydropneumatic damping device particularly for spring legs of automotive vehicles comprises an inner cylinder, an outer container, a central cavity within the inner cylinder, an annular cavity between the inner cylinder and the outer container, a piston rod with a piston unit, venting passage means between the central cavity and the annular cavity extending across a cavity-closing unit and check valve means associated to said venting passage means. The check valve means comprises an annular check valve member in frictional sliding engagement with the piston rod for axial movement with the piston rod towards a sealing position during inward movement of the piston rod and towards an opening position during the outward movement of the piston rod. First and second abutment means are provided for defining the sealing and the opening position of the annular check valve member, respectively. The second abutment means are axially fixed with respect to the cavity-closing unit by supporting means separated from the cavity-closing unit and fixed with respect to the respective end of the container.

16 Claims, 4 Drawing Figures

7
HYDROPNEUMATIC DAMPING DEVICE

BACKGROUND OF THE INVENTION

The present invention relates generally to a hydropneumatic damping device. The hydropneumatic damping device comprises an inner cylinder having an axis and two ends, namely a first end and a second end. A central cavity is defined within the inner cylinder between said two ends. An outer container surrounds the inner cylinder. The outer container has first and second ends adjacent the first and second ends of the inner cylinder, respectively. An annular cavity is defined between the inner cylinder and the outer container. First and second closure means are provided for closing the first and second ends of the cylinder and the container, respectively. Piston rod passage means extend through the first ones of the closure means. Fluid passage means are provided between the central cavity and the annular cavity adjacent the second closure means. First fluid throttling means are associated to the fluid passage means. A piston rod axially extends through the piston rod passage means and into the central cavity. A piston unit is mounted on the piston rod within the central cavity and defines two working chambers within the central cavity. A first working chamber is defined adjacent the first closure means and a second working chamber is provided adjacent the second closure means. Fluid connecting means are provided for connecting the two working chambers across the piston unit. Second fluid throttling means are associated to said fluid connecting means. A body of liquid is provided at least within the central one of the cavities. A body of gas is provided within the annular cavity.

The first closure means comprise a cavity-closing unit surrounding the piston rod and having an axially inner end adjacent the first working chamber and an axially outer end. Securing means are provided on the container adjacent the first end thereof for axially securing said cavity-closing unit with respect to the first end of the cylinder. A sealing unit engages the piston rod and has an outer side exposed to atmosphere and an inner side adjacent the cavities and axially outward of the axially inner end of the cavity-closing unit. Venting passage means are provided between the first working chamber and the annular cavity. These venting passage means extend across the cavity-closing unit on the inner side of the sealing unit. Check valve means are associated to the venting passage means permitting gas residues to flow from the first working chamber towards the annular cavity and preventing reverse flow. These check valve means comprise an annular check valve member in frictional sliding engagement with the piston rod for axial movement with the piston rod towards a sealing position during inward movement of the piston rod and towards an opening position during outward movement of the piston rod. First and second abutment means are provided for defining said sealing position and said opening position of the annular check valve member, respectively.

Such a hydropneumatic damping device is known from U.S. Pat. No. 4,287,970. In this patent the second abutment means are defined by an annular abutment disc which is fixed with respect to the cavity-closing unit by deformation of the material of the cavity-closing unit. The assembling of the cavity-closing unit and the annular abutment disc is rather difficult and expensive. Moreover, there is as risk that the cavity-closing unit is damaged during the deformation step. Moreover, it is to be observed that considerable axial forces act upon the annular abutment disc in operation such that a highly reliable fixation of the annular abutment disc is necessary with respect to the cavity-closing unit. Therefore, the assembling of the cavity-closing unit and the abutment disc is still more difficult.

It is a primary object of this invention to avoid the above-mentioned difficulties of the known type of hydropneumatic damping device. More particularly, it is an object of the invention to provide a hydropneumatic damping device in which at least the second abutment means are fixed to the closing unit such as to reliably withstand the axial forces ocurring in operation.

SUMMARY OF THE INVENTION

In view of the above object with a hydropneumatic damping device of the above-mentioned type at least the second abutment means are axially secured with respect to the cavity-closing unit by supporting means separate from the cavity-closing unit and fixed with respect to the container. The supporting means comprise according to a preferred embodiment of the invention the above defined securing means. These securing means warrant a rigid fixation of the second abutment means with respect to the cavity-closing unit. By the application of the securing means the second abutment means are automatically also secured with respect to the cavity-closing unit.

Other features, additional objects and many of the attendant advantages of the invention will readily be appreciated as the same becomes better understood by reference to the following detailed description of preferred embodiments when considered in connection with the appended drawings in which.

Figure 1:
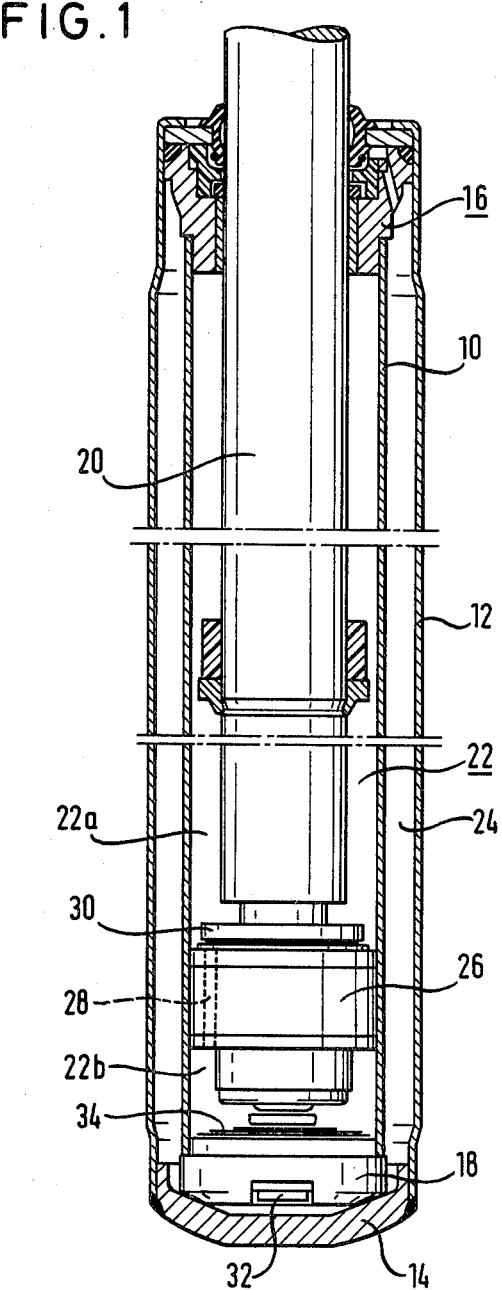
FIG. 1 is a longitudinal section of a hydropneumatic damping device of this invention to be used in connection with a spring leg for an automotive vehicle.
Figure 2:
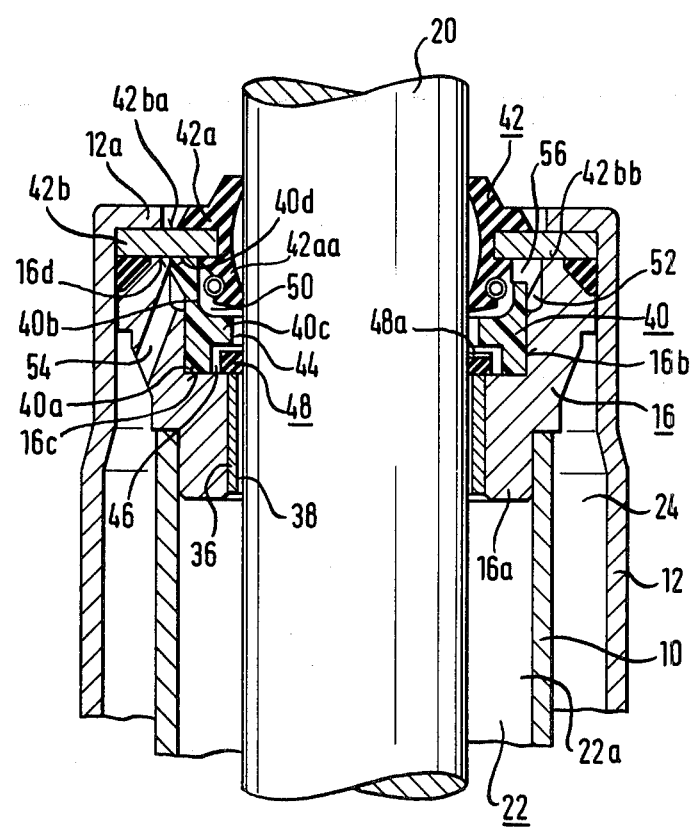
FIG. 2 is an enlarged sectional view of the upper end of the hydropneumatic damping device as shown in FIG. 1.
Figure 3:
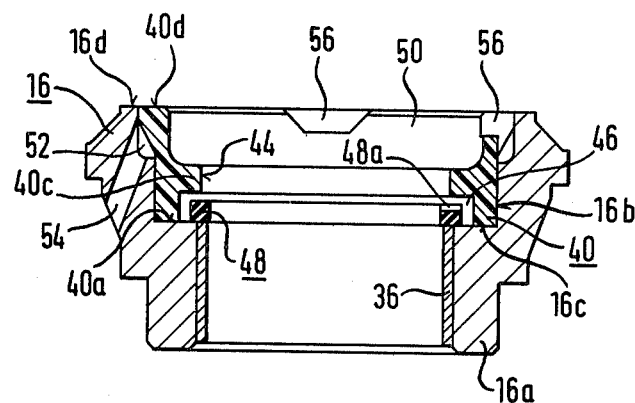
FIG. 3 is a sectional view of the cavity-closing unit and the cage member providing the second abutment means according to a first embodiment of this invention.

In FIGS. 1, 2, 3 there is illustrated a double-cube shock absorber for a combination with a spring unit.

In FIG. 1 a cylinder is designated by 10. This cylinder 10 is surrounded by a container 12. The cylinder 10 is centered with respect to the container by a bottom wall 14 and a cavity-closing unit 16. A central cavity 22 is defined within the cylinder 10 and an annular cavity between the cylinder 10 and the container 12. A piston rod 20 is introduced into the cavity 22 through the cavity-closing unit 16. A piston unit 26 is fixed to the piston rod 20 within the central cavity 22, the piston unit 26 dividing the central cavity into a first working chamber 22a and a second working chamber 22b. The working chambers 22a and 22b are interconnected by fluid connecting means 28. Fluid throttling means diagrammatically indicated by 30 are associated to the fluid connecting means 28. The second working chamber 22b is interconnected with the annular cavity 24 through the bottom valve unit 18 by fluid passage means diagrammatically indicated at 32. Fluid throttling means are associated also to these fluid passage means as diagrammatically indicated at 34.

The upper end of the double-cube shock absorber is shown in more detail in FIG. 2.

As shown in FIG. 2, the cavity-closing unit 16 is inserted with its inner end 16a into the upper end of the cylinder 10. The cavity-closing unit 16 engages the radially inner face of the container 12. A guiding sleeve 36 is inserted in the inner end portion 16a of the cavity-closing unit 16. The guiding sleeve 36 surrounds the piston rod 20 with a gap 38. This gap is shown in FIG. 2 in an enlarged scale. In reality the gap 38 has an extremely small radial width. An annular recess 16b is provided in the upper portion of the cavity-closing unit 16. This annular recess 16b has a bottom face 16c. The guiding sleeve 36 has its upper end face lying in the bottom face 16c. A cage member 40 is press-fitted into the annular recess 16b. The axial length of the cage member 40 substantially corresponds to the axial depth of the recess 16b. An axial inner end face 40a of the cage member 40 is in axial engagement with the bottom face 16c of the annular recess 16b. A sealing unit 42 surrounds the piston rod 20. This sealing unit 42 comprises a sealing member 42a engaging the piston rod 20. A carrier member 42b of the sealing member 42a has an axially outer face 42ba and an axially inner face 42bb. The axially inner face 42bb axially engages an axially outer end face of the unit 16. A radially inwardly bent end portion 12a of the container 12 engages the axially outer end face 42ba of the carrier member 42b. An axially inner portion 42aa of the sealing member 42a is received by a receiving chamber 40b of the cage member 40. An annular radially inwardly directed projection 40c is provided on the cage member 40 and defines a gap 44 with the piston rod 20. A first venting space 46 is defined between the bottom face 16c and the annular projection 40c. An annular check valve member 48 is provided within the first venting space 46. The axial width of the check valve member 48 is smaller than the axial distance of the bottom face 16c and the annular projection 40c. A second venting space 50 is defined within the receiving chamber 40b between the cage member 40 and the sealing member 42 The second venting space 50 is in fluid connection with the gap 44. A third annular venting space 52 is defined within the annular recess 16b. The third annular venting space 52 is connected by bores 54 to the annular cavity 24. On the other hand the third annular venting space 52 is in fluid communication with the second annular venting space 50 by slots 56 provided in the axially outer end face 40d of the cage member 40.

The working chambers 22a and 22b are filled with a hydraulic liquid. Gas bubbles may be present within the first working chamber 22a as a result of a foaming of the liquid within the working chamber 22a.

In operation when the piston rod 20 moves in outward direction such gas bubbles may escape through the gap 38, the first annular venting space 46, the gap 44, the second annular venting space 50, the slots 56, the third annular venting space 52, and the bores 54 into the annular cavity 24. On outward movement of the piston rod 20 the annular check valve member 48 is in engagement with the annular projection 40c. For connecting the first annular venting space 46 with the annular gap 44 under such conditions recesses 48a may be provided in the upper end face of the annular check valve member 48.

When the piston rod 20 is moving inwardly the annular check valve member 48 is in the position as shown in FIG. 2 so that the annular gap 38 is closed and no gas can enter into the first working chamber 22a. It is to be noted that very small amounts of hydraulic fluid can also escape through the gap 38 into the first annular venting space 46. This hydraulic fluid can also return through the gap 44, the second annular venting space 50, the slots 56, the third annular venting space 52, and the bores 54 into the annular cavity 24. This has the favorable effect that the axially inner portion 42aa of the sealing member 42a is always immersed into the hydraulic liquid. So the sealing function of the sealing unit 42 is improved. This is of particular importance with such damping devices in which there is always a superatmospheric pressure within the central cavity 22 and the annular cavity 24.

Axial forces acting onto the cage member 40 particularly during outward movement of the piston rod 20 are transmitted to the annular carrier member 42b and to the radially inwardly bent end portion 12a. It is to be noted that by the radially inward bending of the end portion 12a the cavity-closing unit 16 is fixed with respect to the upper end of the cylinder 10, the sealing unit 42 is fixed with respect to the upper end of the cavity-closing unit 16 and the cage member 40 is also axially fixed with respect to the cavity-closing unit 16.

It is to be noted that the axial length of the cage member 40 may exceed the axial depth of the recess 16b so that the cage member 40 is axially compressed when assembling the unit.

It is further to be noted that instead of the recess 48a provided in the annular check valve member 48 there may be a recess in the annular projection 40c for interconnecting the first annular venting space 46 and the gap 44 on outward movement of the piston rod 20.

As the cage member 40 is press-fitted into the annular recess 16b no deformation of the cage member 40 is to be expected under operational pressure. Moreover, an escape of fluid is prevented around the cage member 40.

Figure 4:
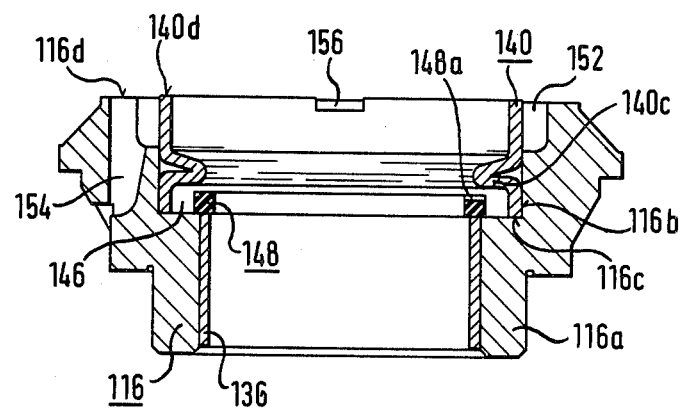
FIG. 4 is a sectional view similar to FIG. 3 according to a second embodiment of the invention.

FIG. 3 shows the cavity-closing unit 16 and the cage member 40 in more detail. In FIG. 4 the plastic molded cage member 40 of FIG. 3 has been replaced by a sheet metal cage member 140. The annular projection 140c is defined by a fold. Also in this embodiment the cage member 140 is press-fitted into the annular recess 116b. Due to the fold 140c the cage member 140 may be axially compressed during assembling.

It should be understood, of course, that the foregoing disclosure relates only to preferred embodiments and that it is intended to cover all changes and modifications of the examples herein chosen for the purpose of the disclosure which do not depart from the spirit and scope of the invention set forth in the appended claims.

It is to be noted that the reference numerals used in the claims are only for a better understanding of the claims and by no means restrictive.

Further it is to be noted that the annular check valve members 48 and 148 fulfill besides the check valve function also an oil-stripping function with respect to the oil adhering to the piston rod 20.

What is claimed is:

1. In a hydropneumatic damping device comprising
    (a) an inner cylinder (10) having an axis and two ends, namely a first end and a second end,
    (b) a central cavity (22) defined within said inner cylinder (10) between said two ends, (c) an outer container (12) surrounding said inner cylinder (10), said outer container (12) having first and second ends adjacent said first and second ends of said inner cylinder (10), respectively, (d) an annular cavity (24) defined between said inner cylinder (10) and said outer container (12), (e) first and second closure means (16, 14) closing said first and second ends of said cylinder (10) and said container (12), respectively, (f) piston rod passage means through the first ones (16) of said closure means, (g) fluid passage means (32) between said central cavity (22) and said annular cavity (24) adjacent the second ones (14) of said closure means, (h) first fluid throttling means (34) associated to said fluid passage means (32), (i) a piston rod (20) axially extending through said piston rod passage means and into said central cavity (22), (k) a piston unit (26) mounted on said piston rod (20) within said central cavity (22) and defining two working chambers (22a, 22b) within said cavity (22), a first working chamber (22a) adjacent said first closure means (16) and a second working chamber (22b) adjacent said second closure means (14), (l) fluid connecting means (28) connecting said two working chambers (22a, 22b) across said piston unit (26), (m) second fluid throttling means (30) associated to said fluid connecting means (28), (n) a body of liquid at least within the central one (22) of said cavities, (o) a body of gas within said annular cavity (24), said first closure means comprising (aa) a cavity-closing unit (16) surrounding said piston rod (20) and having an axially inner end (16a) adjacent said first working chamber (22a) and an axially outer end, (bb) securing means (12a) provided on said container (12) adjacent the first end thereof for axially securing said cavity-closing unit (16) with respect to said first end of said cylinder (10), (cc) a sealing unit (42) engaging said piston rod (20) and having an outer side exposed to atmosphere and an inner side adjacent said cavities (22, 24) and axially outward of the axially inner end (16a) of said cavity-closing unit (16), (dd) venting passage means (38, 46, 44, 50, 56, 52, 54) between said first working chamber (22a) and said annular cavity (24) extending across said cavity-closing unit (16) on the inner side of said sealing unit (42), (ee) check valve means (16c, 48, 40c) associated to said venting passage means (38, 46, 44, 50, 56, 52, 54) permitting gas residues to flow from said first working chamber (22a) towards said annular cavity (24) and preventing reverse flow, said check valve means (16c, 48, 40c) comprising an annular check valve member (48) in frictional sliding engagement with said piston rod (20) for axial movement with said piston rod (20) towards a sealing position during inward movement of said piston rod (20) and towards an opening position during outward movement of said piston rod (20), first (16c) and second (40c) abutment means being provided for defining said sealing position and said opening position of said annular check valve member (48), respectively, the improvement comprising: at least said second abutment means (40c) being axially secured with respect to said cavity-closing unit (16) by supporting means separate from said cavity-closing unit (16) and fixed with respect to said outer container.

2. A hydropneumatic damping device as set forth in claim 1, said supporting means comprising said securing means (12a).

3. A hydropneumatic damping device as set forth in claim 2, said securing means (12a) acting upon said second abutment means (40c) through a part (42b) of said sealing unit (42).

4. A hydropneumatic damping device as set forth in claim 3, said sealing unit (42) comprising a sealing member (42a) engaging said piston rod (20) and a carrier member (42b) extending radially outwardly from said sealing member (42a), said carrier member (42b) having an axially inner face (42bb) engaging an axially outwardly directed end face (16d) of said cavity-closing unit (16) and an axially outer face (42ba) being engaged by said securing means (12a), said second abutment means (40c) being axially fixed with respect to said cavity-closing unit (16) by said securing means (12a) through said carrier member (42b).

5. A hydropneumatic damping device as set forth in claim 2, wherein said securing means (12a) comprise a radially inwardly bent end portion of said container (12).

6. A hydropneumatic damping device as set forth in claim 2, said second abutment means (40c) being provided on a cage member (40) fixed with respect to said cavity-closing unit (16) by said securing means (12a), said second abutment means (40c) being defined by at least one radially inwardly directed projection (40c) of said cage member (40), said first abutment means (16c) being defined by an axially outwardly directed abutment face (16c) of said cavity-closing unit (16).

7. A hydropneumatic damping device as set forth in claim 6, said cage member (40) being at least partially housed in an annular recess (16b) of said cavity-closing unit (16) surrounding said piston rod (20).

8. A hydropneumatic damping device as set forth in claim 7, said cage member (40) defining an annular receiving chamber (40b) axially outward of said projection (40c) and surrounding said piston rod (20), said annular receiving chamber (40b) receiving a portion (42aa) of said sealing unit (42).

9. A hydropneumatic damping device as set forth in claim 8, said venting passage means comprising a first annular venting space (46) axially between said abutment face (16c) and said projection (40c) and receiving said annular check valve member (48), a first passage section (38) interconnecting said first annular venting space (46) with said first working chamber (22a) through said cavity-closing unit (16), a second annular venting space (50) within said annular receiving chamber (40b), a second passage section (44) interconnecting said first annular venting space (46) and said second annular venting space (50) across said projection (40c), a third annular venting space (52) within said annular recess (16b), a third passage section (56) interconnecting said second annular venting space (50) and said third annular venting space (52) through said cage member (40), and a fourth passage section (54) interconnecting said third annular venting space (52) with said annular cavity (24) through said cavity-closing unit (16).

10. A hydropneumatic damping device as set forth in claim 6, wherein said cage member (40) is plastic molded.

11. A hydropneumatic damping device as set forth in claim 6, wherein said cage member (140) is made from sheet metal, said projection (140c) being defined by an annular fold.

12. A hydropneumatic damping device as set forth in claim 7, said cage member (40) being press-fitted within said annular recess (16b).

13. A hydropneumatic damping device as set forth in claim 7, said cage member (40) having an axial length substantially corresponding to the axial depth of said annular recess (16b).

14. A hydropneumatic damping device as set forth in claim 7, said cage member (40) having an axially outer end face (40d) engaging a part (42b) of said sealing unit (42), said sealing unit (42) being fixed to said cavity-closing unit (16) by said securing means (12a).

15. A hydropneumatic damping device as set forth in claim 7, said cage member (40) being inserted into said recess 16b) from the axially outer end thereof.

16. A hydropneumatic damping device as set forth in claim 6, wherein said cage member (40) has an axially inwardly directed end face, said axially inwardly directed end face (40a) engaging said axially outwardly directed abutment face (16c).

* * * * *